US009516354B1

(12) United States Patent
Verheem et al.

(10) Patent No.: US 9,516,354 B1
(45) Date of Patent: Dec. 6, 2016

(54) BONDED WIRELESS HOTSPOT

(71) Applicant: Teradek LLC, Irvine, CA (US)

(72) Inventors: Nicolaas Louis Verheem, Laguna Niguel, CA (US); Ilya Issenin, Irvine, CA (US); Dennis Craig Scheftner, Laguna Hills, CA (US)

(73) Assignee: TERADEK LLC, Irvine, CA (US)

( * ) Notice: Subject to any disclaimer, the term of this patent is extended or adjusted under 35 U.S.C. 154(b) by 0 days.

(21) Appl. No.: 14/109,790

(22) Filed: Dec. 17, 2013

Related U.S. Application Data (60) Provisional application No. 61/740,287, filed on Dec. 20, 2012.

(51) Int. Cl.
| | |
|---|---|
| *H04N 7/173* | (2011.01) |
| *H04N 21/2187* | (2011.01) |
| *H04L 29/06* | (2006.01) |
| *H04N 21/222* | (2011.01) |

(52) U.S. Cl.
CPC .......... *H04N 21/2187* (2013.01); *H04L 65/60* (2013.01); *H04N 21/2223* (2013.01)

(58) Field of Classification Search
None
See application file for complete search history.

(56) References Cited

U.S. PATENT DOCUMENTS

| | | | |
|---|---|---|---|
| 7,567,620 B2 | 7/2009 | Rozental | |
| 7,738,391 B2 | 6/2010 | Melpignano et al. | |
| 7,948,933 B2 | 5/2011 | Ohayon et al. | |
| 2002/0049979 A1* | 4/2002 | White et al. | 725/87 |
| 2004/0117845 A1* | 6/2004 | Karaoguz et al. | 725/134 |
| 2004/0261135 A1* | 12/2004 | Cahnbley et al. | 725/146 |
| 2006/0143678 A1* | 6/2006 | Chou et al. | 725/118 |
| 2009/0074051 A1 | 3/2009 | Manapragada et al. | |
| 2009/0241148 A1 | 9/2009 | Lo | |
| 2010/0180291 A1* | 7/2010 | Kahn et al. | 725/31 |
| 2010/0299703 A1 | 11/2010 | Altman | |
| 2010/0332569 A1 | 12/2010 | Bryant-Rich et al. | |
| 2011/0044603 A1 | 2/2011 | Honda | |
| 2011/0047583 A1 | 2/2011 | Howard et al. | |
| 2011/0119705 A1 | 5/2011 | Meyers | |
| 2011/0280540 A1* | 11/2011 | Woodman | 386/201 |
| 2012/0017253 A1* | 1/2012 | Hicks et al. | 725/114 |
| 2012/0113265 A1 | 5/2012 | Galvin | |

(Continued)

FOREIGN PATENT DOCUMENTS

| | | |
|---|---|---|
| EP | 2166747 A1 | 3/2010 |
| JP | 04463850 B2 | 5/2010 |

(Continued)

OTHER PUBLICATIONS

Apostolopoulos et al., "Proxy Support for Streaming on the Internet: Path Diversity for Enhanced Media Streaming," IEEE Communications Magazine, Aug. 2004.

(Continued)

*Primary Examiner* — Fernando Alcon
(74) *Attorney, Agent, or Firm* — Knobbe, Martens, Olson & Bear, LLP (57) ABSTRACT

One embodiment of a transmission device includes: a transmission controller comprising one or more processors, the transmission controller configured to: receive a plurality of trasmitters; receive a live video signal from a video encoder device over a local area network; divide the live video signal into a plurality of live video transmissions; and broadcast the plurality of live video transmissions over a wide area network.

19 Claims, 5 Drawing Sheets

(56) References Cited

U.S. PATENT DOCUMENTS

| | | | |
|---|---|---|---|
| 2013/0120592 A1* | 5/2013 | Bednarczyk et al. | 348/207.1 |
| 2014/0082208 A1* | 3/2014 | Ojanper | 709/231 |
| 2014/0157336 A1* | 6/2014 | Deegan et al. | 725/91 |
| 2014/0160304 A1 | 6/2014 | Galor et al. | |
| 2014/0267871 A1 | 9/2014 | Baek | |

FOREIGN PATENT DOCUMENTS

| | | | | |
|---|---|---|---|---|
| KR | 10-2013 0010277 A | | 1/2013 | |
| KR | 10-2013 0010277 A | | 1/2013 | |
| WO | WO2004075550 | * | 9/2004 | H04N 7/173 |

OTHER PUBLICATIONS

Chebrolu et al., "Bandwidth Aggregation for Real-Time Applications in Heterogeneous Wireless Networks", IEEE Transactions on Mobile Computing, vol. 5, No. 4, pp. 388-403, Apr. 2006.

Chebrolu et al., "Communication using Multiple Wireless Interfaces," Wireless Communications and Networking Conference, 2002, IEEE (vol. 1), pp. 327-331.

Ding et al., "Error Resilient Video Transmission over Wireless Networks," WSTFEUS, 2003.

El Al et al., "LS-SCTP: a bandwidth aggregation technique for stream control transmission protocol," Computer Communications, vol. 27, Issue 10, pp. 1012-1024, Jun. 2004.

Fernandez et al., "Bandwidth Aggregation-Aware Dynamic QoS Negotiation for Real-Time Video Streaming in Next-Generation Wireless Networks," IEEE Transactions on Multimedia, vol. 11, No. 6, Oct. 2009.

Gogate et al., "Supporting Image and Video Applications in a Multihop Radio Environment Using Path Diversity and Multiple Description Coding," IEEE Transactions on Circuits and Systems for Video Technology, vol. 12, No. 9, pp. 777-792, Sep. 2002.

Liu et al., "Error Control for Schemes for Networks: An overview," Mobile Networks and Applications 2, pp. 167-182, 1997.

Magalhaes et al., "MMTP—Multimedia Multiplexing Transport Protocol," In Proceedings of the First Workshop on Data Communications in Latin America and the Caribbean (SIGCOMM-LA), pp. 220-243, 2000.

Magalhaes, Luiz, "A Transport Layer Approach to Host Mobility," a Dissertation, University of IL, Sep. 2005.

Qureshi et al., "Horde: Separating Network Striping Policy from Mechanism," 3rd International Conference on Mobile Systems, Applications, and Services, Seattle, WA, Jun. 2005.

Qureshi et al., "Separating Network Striping Policy from Mechanism," Power Point Presentation, 3rd International Conference on Mobile Systems, Applications, and Services, Seattle, WA, Jun. 2005.

Qureshi, Asfandyar, "Flexible Application Driven Network Striping over Wireless Wide Area Networks", Massachusetts Institute of Technology, Cambridge, MA, Mar. 2005.

Qureshi, Asfandyar, "Flexible Network Striping", Power Point Presentation, RQE Talk, Massachusetts Institute of Technology, Cambridge, MA, Aug. 2006.

Sheldon, Tom, "McGraw-Hill Encyclopedia of Networking and Telecommunications: Error Detection and Correction," pp. 457-458, Osborne/McGraw-Hill, Berkeley, CA, 2001.

Snoeren, Alex C., "Adaptive Inverse Multiplexing for Wide-Area Wireless Networks," In Proceedings of IEEE GlobeCom, Rio de Janeiro, Dec. 1999.

International Search Report; Jun. 19, 2104; PCT/US2014/021226; 14 pages.

Office Action issued in U.S. Appl. No. 14/198,448, on May 21, 2015.

Office Action issued in U.S. Appl. No. 14/198,462, on Jun. 8, 2015.

International Search Resport dated Jun. 20, 2014, International Application No. PCT/US2014/021226.

* cited by examiner

BONDED WIRELESS HOTSPOT

CROSS-REFERENCE TO RELATED APPLICATIONS

This application is based upon, and claims the benefit of priority from, U.S. Provisional Application No. 61/740,287, filed on Dec. 20, 2012, the entire contents of which is hereby incorporated herein by reference in its entirety.

BACKGROUND

Live video, such as news, can generate high revenue and/or interest on television and on the Internet. In order to obtain live media content transmissions, many organizations such as television (TV) station, send camera crews to different locations where events of interest are occurring. The camera crews can take live video obtained at the location and then broadcast the live video. Such live video transmission can be sent over cable, satellite or other data networks.

SUMMARY OF CERTAIN EMBODIMENTS

In one embodiment, a bonded transmission device is disclosed. The bonded transmission device may include: a transmission controller comprising one or more processors, the transmission controller configured to: receive a plurality of transmitters; receive a live video signal from a video encoder device over a local area network; divide the live video signal into a plurality of live video transmissions; and broadcast the plurality of live video transmissions over a wide area network.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DETAILED DESCRIPTION

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. Embodiments of a live video transmission system are described below that enable the broadcast of live video over the Internet or other networks by using bonded encoding solutions that allow multiplexing of several cellular or other wireless transmitter devices into a single broadband connection capable of transmitting live media content (for example news) from many locations.

Figure 1:
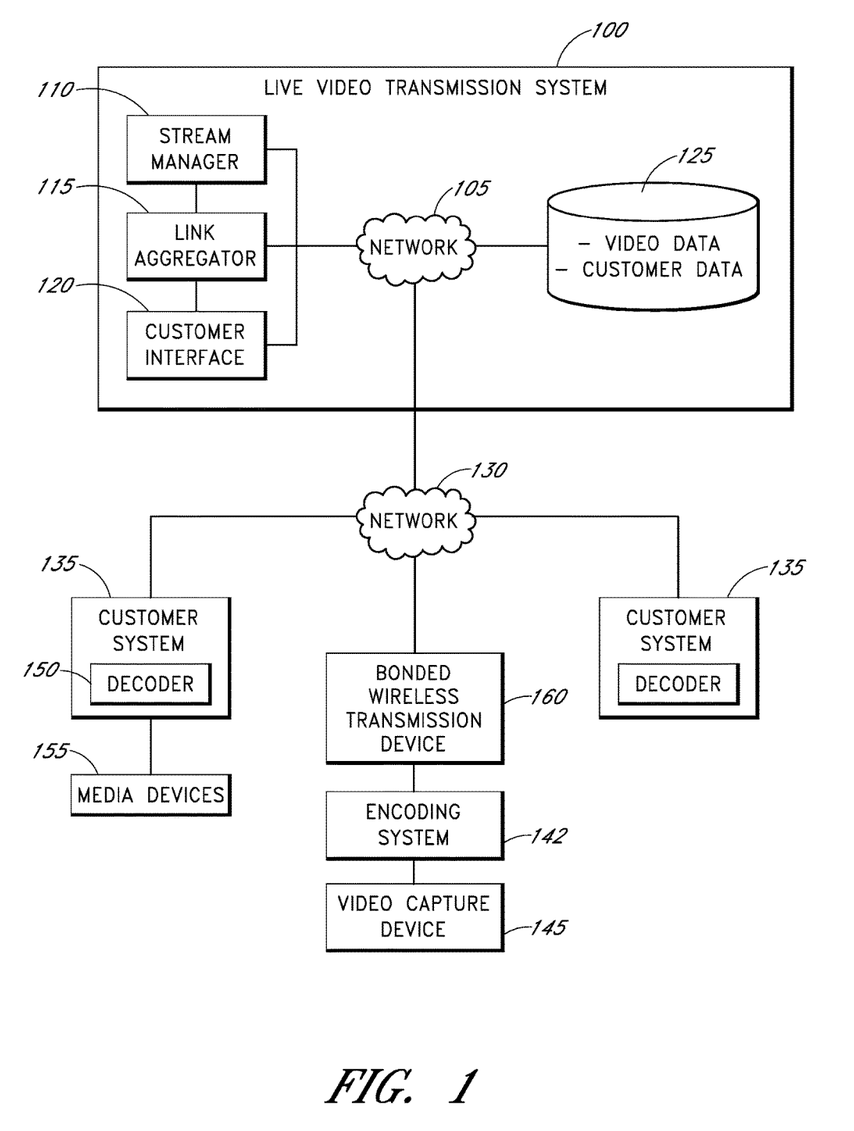
FIG. 1 is a network diagram schematically illustrating an embodiment of a live video transmission system for transmitting media content using bonded transmissions.

FIG. 1 is a network diagram schematically illustrating one embodiment of an example of a live video transmission system 100 for transmitting media content using bonded transmissions. In one embodiment, the live video transmission system 100 operates on a data center operated by a computing resource provider (for example, a cloud computing provider such as Amazon AWS, Rackspace or Akamai). In one embodiment, the live video transmission system 100 operates on a server system of the live video transmission system operator. In some embodiments, components of the system may include products from Teradek, LLC of Irvine, Calif.

The live video transmission system 100 can include support for multiple formats of streaming such as Real Time Streaming Protocol ("RTSP"), Real Time Messaging Protocol ("RTMP"), Moving Picture Experts Group Transport Stream ("MPEG-TS"). In some embodiments, the live video transmission system 100 uses link protocols, such as those employed by Teradek's Link product, to reconstruct the live video feeds from multiple transmitting sources and make it available for recording or rebroadcasting in a number of standard formats. For example, in situations where bandwidth is limited at a video capture location (for example, a breaking news site), a bonded wireless transmission system 160 may be deployed at the video capture location that splits the video stream in separate streams for transport on multiple network paths (for example, cellular networks, landlines, Wi-Fi, combinations of the same or the like). In other embodiments, streams may be completely or partially duplicated, wherein redundant data is transmitted over multiple paths simultaneously. The transmission manager 264 may send the same data through more than one transmission path at the same time based on settings or transmission path conditions.

In some embodiments, the live video transmission system 100 provides a real time index of content from several contributors (for example, stringers or other video capture personnel), and make the content searchable to any subscribed customer. In one embodiment, content is searchable by location, text strings, name of contributor, social media hashtags (for example, #planecrash), combinations of the same or the like. Search results can include the above meta data as well as thumbnails or even watermarked live video feeds.

Customers (for example, content distributors such as TV stations or news websites) may be able to buy a subscription or otherwise subscribe to live video content via the customer interface 120. For example, the customer interface 120 may provide access to an online marketplace or electronic catalog with bidding and "buy now" capabilities. Once customers are subscribed, authenticated and/or paid up, the video may be connected over the Internet to the decoder at the customer's own facility, and can be integrated with the customer's existing workflow.

The live video transmission system 100 can also include recording as well as transcoding capabilities, allowing video to be sent directly to web portals owned by the customer and/or public content delivery networks ("CDNs"), such as livestream.com, Ustream.tv, Justin.tv or the like.

In some embodiments, the live video transmission system 100 includes the ability to track subscriptions to a feed. In some cases, such as when live video is provided by third-party contributors, the system may automatically calculate the total payment due to the contributors, as well any commissions or charges for use of the system. For example, the live video transmission system 100 may record all purchases for a given live video stream in order to calculate the total payments and commission due.

In some embodiments, the live video transmission system 100 includes various components that may be connected via a network 105, a system bus or other communications medium. For example, the components may be operating distributedly on several computing devices on the computer network. In some embodiments, some or all of components are operating on the same computing device. In the illustrated FIG. 1, the live video transmission system 100 includes: a stream manager 110 configured to route, direct, or otherwise control video streams; a link aggregator 115 configured to combine video streams sent on multiple communication paths; a customer interface 120 configured to provide interactions with customers; and a data repository 125 configured to store data such as video, video metadata, and/or customer data. In some embodiments, the live video transmission system 100 further includes, controls, and/or monitors one or more on-site bonded wireless transmission systems.

In one embodiment, the first network 105 is in communication with a second network 130, which can include private and public networks, such as the Internet. For example, the Internet can provide access to one or more customer computing systems 135, which may communicate with private networks. A customer computing system 135 can include one or more computing devices that may be operating on a network with access to the Internet. The private network can be an organization's network that is wholly or partially inaccessible from computing systems external to the private network. Customer computing systems can include various computing systems, such as desktop, server or mobile computing devices that connect directly (for example, via a telephone line, cable modem, a Digital Subscriber Line ("DSL"), cellular network or other wireless connection, and so forth) or indirectly to the Internet. While the second network 130 is described as a different network than the first network 105, it need not be, and in some cases, the first network and the second network are the same.

In one embodiment, the live video transmission system 100 provides access to a catalog of live video streams to the customer systems 135 via the customer interface 120. Customers can use the customer interface 120 (for example, a web service, application program interface, message protocol or the like) to select, view, purchase and/or bid on various live video streams.

In some embodiments, the live video transmission system 100 communicates with the one or more on-site bonded wireless transmission systems 160 over the second network 130. For example, in certain embodiments, the encoding system 140 receives video data from video capture devices 145 (for example, video cameras) and encodes the data and provides the encoded data to a bonded wireless transmission device that is configured to transmit the data to the live video transmission system 100 using one or more transmitters. The transmitters can include cellular modems (for example, 3G or 4G modems), Wi-Fi devices (802.11 a/b/g/n/ac and so forth), other wireless transmitters, or other wired or connected transmitters. In some embodiments, the system 100, or a component of the system (for example, the stream manager 110), is configured to control and/or monitor transmissions from the wireless transmission device. For example, the transmission device/system 160 can send information about the status of transmissions or of the transmission device and/or transmitters. In one embodiment, the system 100 is able to control which transmitters are used to transmit data and/or parameters (for example, bit rate, video quality level, and so forth) associated with media content transmissions.

In one embodiment, the bonded wireless transmission device 160 provides high definition ("HD") streaming. For example, the transmission device may be able to stream up to 1080p30 video directly to decoders located on the customer systems. In some embodiments, the transmission device 160 is able to stream directly to a website, social media page, or content delivery network ("CDN"). The transmission device can support multiple transport protocols, including RTMP, Real-time Transport Protocol ("RTP")/RTSP, RTP Push, MPEG-TS, and/or Hypertext Transfer Protocol ("HTTP") Live Streaming ("HLS"). In one embodiment, the transmission device supports streaming over various transmission systems or transmitters, such as dual band multiple-input and multiple-output ("MIMO") Wi-Fi, standard Wi-Fi, Ethernet, or a 3G/4G USB modem, allowing users to stream from various locations worldwide. In one embodiment, the transmission device supports various transport protocols, such as RTP, RTSP, RTMP, MPEG-TS, and HLS.

The bonded wireless transmission device 160 can transmit live video streams to the live video transmission system 100. In some embodiments, the live video stream from the transmission device 160 may be sent as multiple split streams or transmission flows on multiple network paths, for example, on different cellular networks. The link aggregator 115 can receive the split streams and combine them into a single video stream. The live video transmission system 100 can then make the live stream available on the customer interface 120, from which customers can select, view, buy, or bid on the video stream. In some cases, a single video stream may be provided to multiple customer systems. For example, the live video transmission system 100 may charge a fee for access to the stream. In some cases, the single video stream may be provided to a single customer system. For example, the live video transmission system 100 may allow customers to bid for exclusive access to the video stream or may otherwise allow customers to purchase exclusive access. In some cases, access to the video stream may be exclusive for a limited time but other customers may be allowed to access it after an exclusivity period expires.

After a customer obtains access rights to a live video stream, the live video transmission system 100 can send the video stream to the customer system 135 associated with the customer. In some embodiments, a decoder 150 of the customer system 135 or connected thereto receives the live video stream and decodes the live video stream into a format usable by the customer system for transmission on its own transmission systems. For example, the live video stream may be encoded in H.264 format or another encoding format and decoded by the decoder 150 into a broadcast format, such as for television. In some embodiments, the live video stream may also be encrypted to prevent unauthorized access to the video stream. After the customer purchases access rights, the live video transmission system 100 can provide decryption keys to the customer's decoder 150 so that the decoder 150 can decrypt the live video stream.

For illustrative purposes, an example data flow is discussed below for live video streams between the different systems described in FIG. 1. The example describes recording a news event. However, the system 100 can be used to transmit other types of events (for example, sporting, celebratory, educational, human interest, weather, and so forth) The example data flow is intended to illustrate but not to limit the disclosure.

Starting at a location where a news event is occurring, a camera person captures the event using a video capture device 145. The video capture device 145 is connected to an encoding system 140, such as Teradek's Cube system, which encodes the live video stream into one or more data streams for transport over one or more network paths. For example, the data may be sent over a cellular network, multiple cellular networks, hard-line the links (for example, Ethernet, cable, DSL, and so forth), combinations of the above, or the like. The data streams are sent to the bonded wireless transmission device and on to the live video transmission system 100.

At the live video transmission system 100, a link aggregator 115 (for example, Teradek's Sputnik) combines the data streams into a single live video stream. In some embodiments, the live video transmission system 100 processes the live video stream, including recording the stream, editing the stream, storing the stream, and/or forwarding the stream. The data repository 125 can store information about the live video stream such as the stream itself, metadata about the stream, contributor credentials, location preview thumbnails, and the like. In some embodiments, the customer interface 120 includes a web based online marketplace that allows bidding on the content. The marketplace can include a paywall or other content access control system that prevents users from accessing webpage content (for example, the live video streams) without a paid subscription. The live video transmission system 100 may also include software and/or hardware that allows integration with content delivery networks ("CDNs") in order to allow the live video transmission system 100 to send live video streams to various locations on the Internet.

At a first customer system 135 (for example, a TV station), a customer may connect to the customer interface (for example, using a browser) to preview live video fees. The feeds may be watermarked to deter unauthorized usage. The customer can review metadata about the fees, GPS location, event name, and so forth. In certain embodiments, the customer interface 120 may be integrated to various news sources (for example, AP/Reuters, and so forth) and social media sites to allow customers to follow related news development. In some embodiments, customers are able to bid on live video streams or buy access rights to video streams. For example, multiple networks may be able to subscribe to the same live video streams or one network may be able to pay a premium price in order to obtain exclusivity. In one embodiment, the live video transmission system 100 is integrated with payment processing sites or includes a billing system that allows customers to be billed for the purchases.

After purchasing access to a live video stream, decoder(s) 150 at the customer system receive an authenticated feed from the live video transmission system 100. In some embodiments, the decoders are connected to the customer system 135 (for example, TV stations) via an HD-SDI switcher to fit into existing broadcast workflows. After the live video stream is decoded into a format usable by the customer system 135, the decoded video stream can be sent out to various media devices 155 (for example, televisions, computers, smartphones, tablets, and so forth) used by content viewers over a wide area network or other connections, such as, for example, leased lines, over-the-air ("OTA") via, for example, microwave links, cable and/or satellite transmission. In some embodiments, the stream may be sent over a combination of connections, such as, for example, some transmissions over local-area-network (LAN), some over WiFi, cell modems, satellite links, and the like. Some of the connections may be bidirectional (such as, for example, network-based LAN, WiFi, and the like), and some of the connections may be unidirectional (such as, for example, microwave links, and the like.) As discussed above, the live video stream may be shared with other networks or may be exclusive content. For example, in the case of shared content, a second customer system 135 (for example, TV Station B) may also be streaming the content to media devices 155 of its own end-users.

Figure 2:
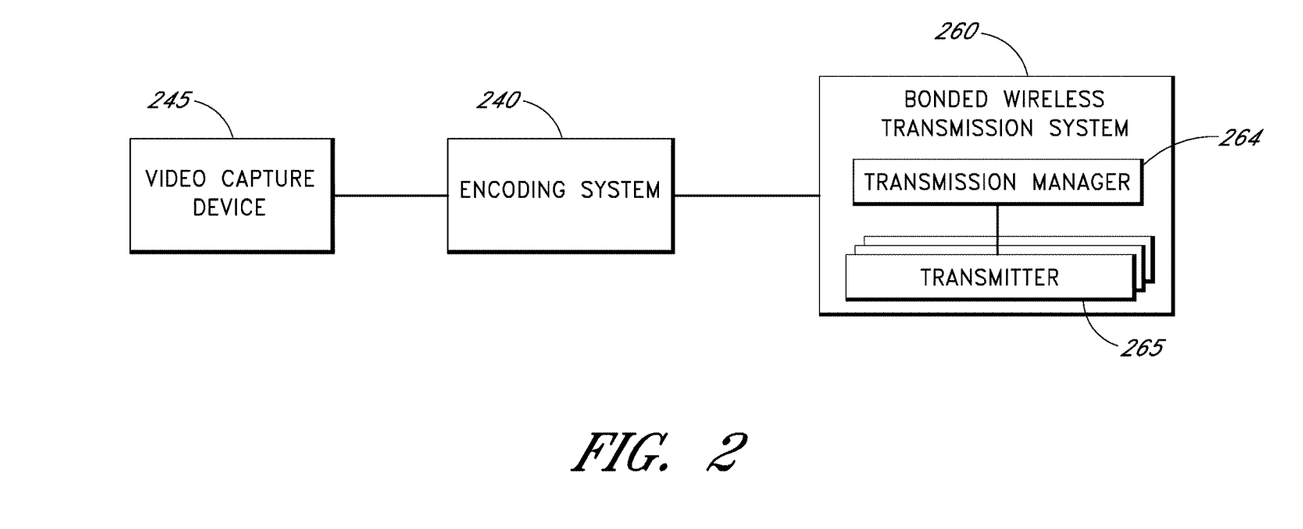
FIG. 2 schematically illustrates an embodiment of an on-site video encoding/transmission system in accordance with the system of FIG. 1.

FIG. 2 schematically illustrates a detailed block diagram of an on-site video transmission system. FIG. 2 includes a video capture device 245, encoding system 240, and bonded wireless transmission system 260, which may be similar to the corresponding modules shown in FIG. 1. In the illustrated embodiment, the video capture device is in communication with an encoding system 240, which may include one or more encoder devices and one or more transmitters. In one embodiment, the components of the encoding system 240 are separate devices. In another embodiment, all or some of the components are included in a single device. The encoding system 240 can be connected to a video capture device 145, from which it receives a media content stream. The encoding system 240 may then encode the media content stream using a desired or selected encoding protocol. The encoding system 240 can then transmit the media content stream over the multiple transmitters 205a-d.

In certain embodiments, the transmission manager/device 264 divides or otherwise separates the content media stream into multiple transmission flows. For example, the transmission manager 264 divides a video/audio signal into a plurality of live transmissions. The multiple transmission flows can then be sent separately over the different transmitters. The transmitters 265 may include cellular modems (for example, 3G or 4G modems), Wi-Fi devices (802.11 a/b/g/n/ac and so forth), other wireless transmitters or other wired or connected transmitters. In certain embodiments, the bonded wireless transmission system and/or transmission manager 264 is a portable cellular bonding solution that enables the video capture device and encoding system to stream HD over a LAN, wherein the wireless transmission system is disposed in an area having strong or adequate cellular connectivity for relaying the stream to a live video transmission system. For example, the bonded wireless transmission system 260 may act as a base station for one or more encoders, the transmission system 260 being placed in an area with good wireless/cellular reception, thereby increasing video stream quality. In certain embodiments, the content media stream is completely or partially duplicated, wherein redundant data is transmitted over multiple paths simultaneously.

With respect to systems configured to transmit live video content over different transmitters and/or transmitter types, various transmitters/transmitter types may be separated into separate priority pools that at least partially determine when and/or how the various transmitters are utilized. For example, one transmission protocol may be favored over another (e.g., WiFi may be preferentially utilized for Internet connection over lower tier modems). As another example, available bandwidth and/or other throughput-related transmission parameters may at least partially determine transmission priority. In some embodiments, the bonded transmission system may shape, limit and/or prioritize the traffic being transmitted through the different transmitters and/or different transmission paths.

When the bonded wireless transmission system 260 is connected to one or more encoders, such as H.264 encoders manufactured by Teradek, LLC, over an a/b/g/n WiFi network, the transmission system 260 may receive an audio and/or video signal from the one or more video/audio encoders over the WiFi connection and intelligently broadcasts the data over two or more aggregated cellular connections. The signal may be received over a local area network or by another connection, over a wire, or wirelessly. In certain embodiments, up to 6 or more aggregated cellular connections may be used to transmit the data to a remote decoder or CDN. Therefore, use of a bonded wireless transmission system, as described herein, may allow for video capture and transmission without the need to carry modems along with the video capture device.

In certain embodiments, the bonded wireless transmission system 260 or one or more of the transmitters can be designed to operate similarly to a mobile hotspot. For example, the bonded wireless transmission system 260, or one or more of the transmitters, may be placed at a location with optimal or relatively good cellular signal strength, wherein one or more encoders is communicatively coupled to the bonded wireless transmission system's WiFi network. In some embodiments, one or more of the transmitters may be selected based on the performance of the transmitters. For example, the transmitter that is performing the best may be selected as the mobile hotspot. In certain embodiments, the encoder and/or video capture device 245 may be positioned up to 300 feet or more away from the bonded wireless transmission system 260 unit while maintaining adequate connection strength. In addition, the transmission system 260 may incorporate wireless access point technology that allows users to access the Internet through the system's WiFi network and/or monitor one or more video streams being transmitted over the system. In such a case, the mobile hotspot uses the one or multiple paths to send traffic not originated from the audio/video encoders.

The transmission manager 264 may adjust the amount of data sent and/or the resolution of the data sent through each transmission path based on transmission path conditions. In certain embodiments, the bonded wireless transmission system 260 dynamically adjusts video parameters in real time to promote reliable content delivery at or around the quality level sustainable by the connection, such as bit rate and/or frame rate. Frame rate adjustment functionality can help ensure that live video data reaches its destination. For example, if cellular service at the on-site location suddenly drops to levels that are too slow to transmit HD-quality video, the transmission system 260 may begin to drop the frame rate until the content reaches its destination intact. This feature may be particularly desirable in the context of breaking news coverage where successful video transmission is highly important. Moreover, the bonded wireless transmission system 260 may be configured to transmit video to a variety of platforms, such as CDN or MPEG-TS decoders. Furthermore, in certain embodiments, the system 260 may be connected oven an Ethernet connection with one or more encoders, such as Teradek Brik or Cube encoders.

In one embodiment, the transmission manager 264 dynamically adjusts the encoder compression parameters including video bit rate and buffer of a video stream in real time to adapt to varying network conditions and/or transmission path conditions, allowing content to be delivered reliably and at a quality commensurate with the available bandwidth. For example, if cellular service at a location drops to levels that are too slow to transmit an HD quality video, the transmission manager can begin to drop the bit rate until the content reaches its destination intact. This feature can be beneficial in situations such as breaking news coverage where successful video transmission is very important. In certain embodiments, the transmission manager 264 is configured to detect/manage bandwidth from both the LAN and WAN sides of the system. For example, if a cellular modem drops out on the WAN side, the transmission manger 264 may be configured to cause the encoder(s) to reduce video stream quality to compensate for the lowered bandwidth.

In one embodiment, the different transmission flows are tagged or otherwise marked to indicate which transmitter was used to send the flow on. For example, the manager 264 can embed a flow identifier into each data packet associated with a particular transmission flow. In some cases, the different flows may already be marked by an identifier and the system 100 can track the flows by the existing identifiers. For example, if the transmission flows include data packets sent using the IP protocol, the system 100 can check for IP addresses associated with the different transmitters in order to identify the source of a particular data packet.

By tagging or otherwise determining sources for the transmission flows, the system 100 can identify a problem transmitter. For example, if a first transmitter of the one or more transmitters 265 crashes, reboots, loses power, or otherwise fails, causing the first transmitter to disconnect, the system 100 can determine that a problem has occurred with the first transmitter based in part on not receiving a transmission flow associated with the first transmitter.

In some embodiments, the transmission manager 264 detects when a transmitter disconnects and notifies the live video transmission system 100 that a transmitter has failed. For example, the transmission manager 264 may receive status data from the transmitters 265. If the transmission manager receives a failure notice or stops receiving status data from a transmitter, the manager can determine that a problem has occurred with a particular transmitter.

In some embodiments, when a transmitter fails, the live video transmission system 100 designates the failed transmitter as suspended. In one embodiment, the traffic (for example, data packets) originally assigned to a suspended transmitter device is allocated to the remaining transmitter devices, thereby allowing the media content transmission to continue uninterrupted. In some embodiments, the transmission manager 264 may retry sending the same data through another transmitter or transmission path when an attempt to send data through the initially selected transmitter or transmission path has failed. In one embodiment, the system 100 directs the transmission manager 264 to attempt to continue sending a copy of some or all of the traffic on the suspended transmitter, thereby allowing the system 100 to detect if the problem passes. In one embodiment, the traffic being sent to the suspended transmitter may be dummy data. If the system 100 detects that the problem has ceased, the system 100 can un-suspend the transmitter and reallocate the traffic between the transmitter devices.

Figure 3:
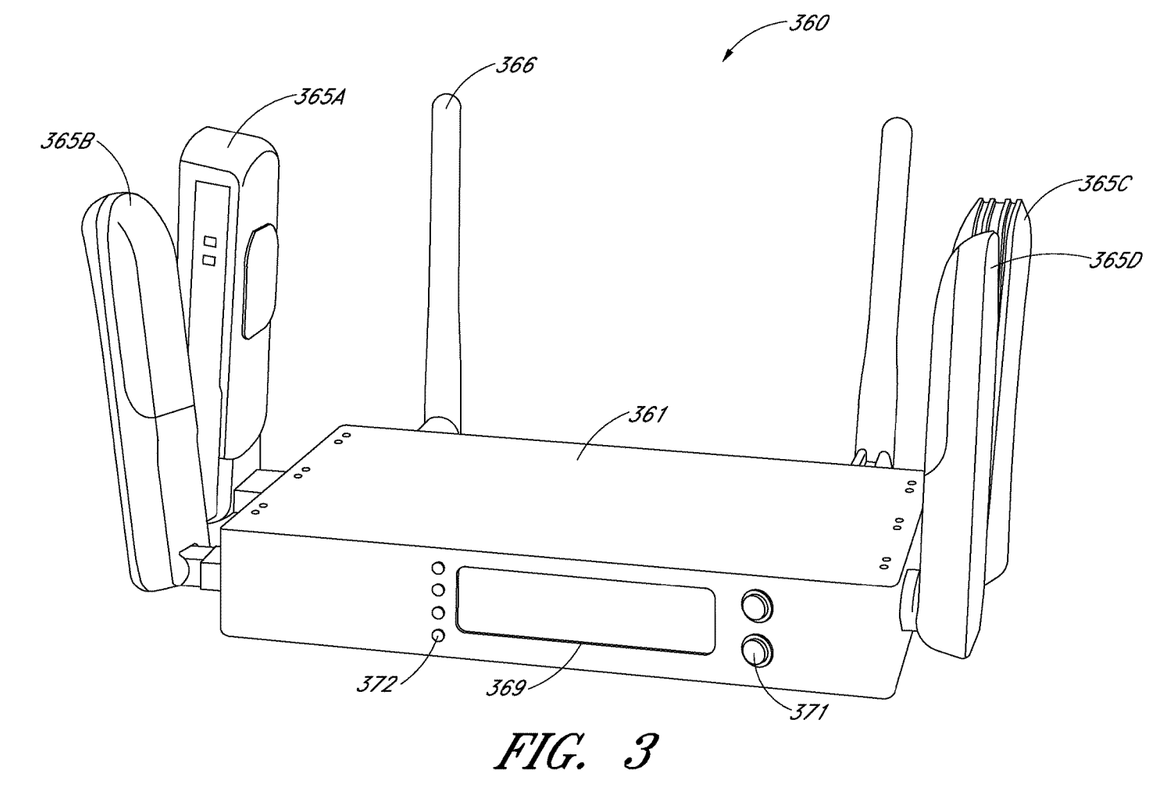
FIG. 3 is a perspective view of an embodiment of a bonded wireless transmission system.

FIG. 3 is a perspective view of an embodiment of a bonded wireless transmission system. In one embodiment, the system 360 includes a transmission manager device 361 including a housing containing transmission management circuitry (not shown). The transmission manager device 361 may include a plurality of electrical ports for connecting one or more cellular modems to the transmission management circuitry. For example, the transmission manager may be used to aggregate the bandwidth of one or more 3G/4G universal serial bus ("USB") modems (for example, 1-5 or more than 5 modems), including modems from various cellular carriers (365A-D). The modems may be associated with different service providers.

The transmission manager device 361 can include a built-in battery (for example, lithium-ion or nickel-cadmium), a display 369 (for example, organic light-emitting diode ("OLED"), liquid crystal display (LCD), and so forth), a removable memory port (for example, micro SD), a sound output (for example, headphone output), one or more input buttons 371 and/or indicator lights 372, and a wireless interface (for example, MIMO Wi-Fi technology, 802.11 or other wireless interface).

Figure 4A:
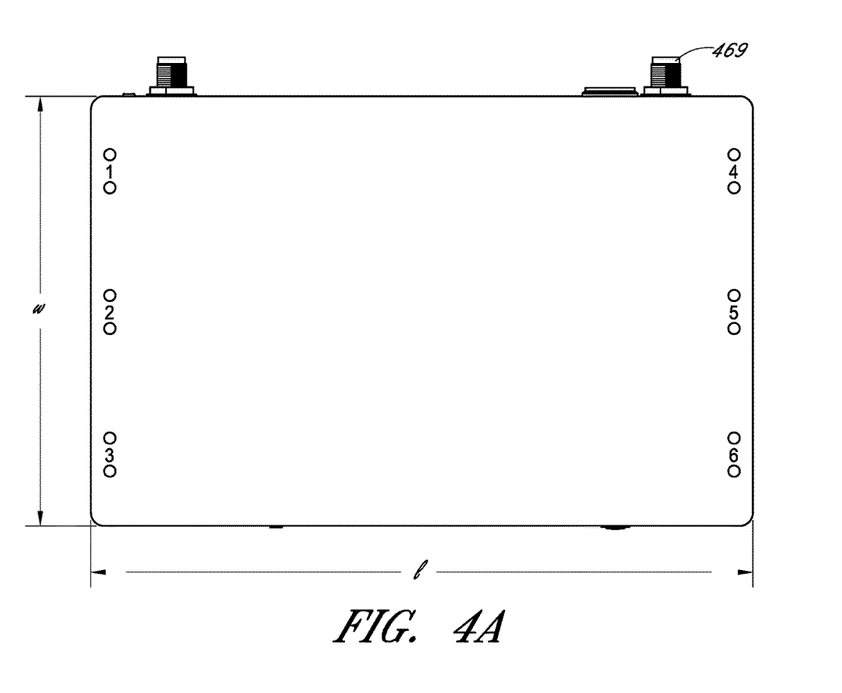
FIG. 4A is a top view of an embodiment of the bonded wireless transmission system of FIG. 3.
Figure 4B:
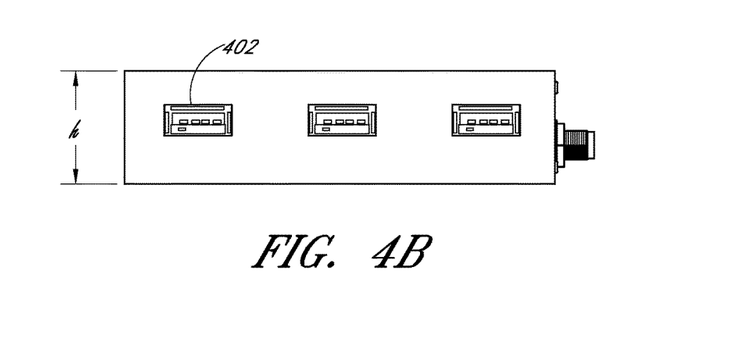
FIG. 4B is a side view of an embodiment of the bonded wireless transmission system of FIG. 3.

FIGS. 4A and 4B show top and side views, respectively, of an embodiment of the transmission manager device of FIG. 3. In certain embodiments the transmission manager device comprises a rigid housing having a substantially rectangular shape. The housing may have a length of 6 inches or less, such as between 5-6 inches. Furthermore, the housing may have a width of less than 4 inches, such as between 3-4 inches. In certain embodiments, the housing has a relatively low profile. For example, the housing may have a height less than approximately 1 inch. A side portion of the housing may include one or more electrical connection ports, such as USB ports, for connecting one or more cellular modems. The housing may additionally include one or more other types of electrical connection ports, such as Ethernet, as well as one or more antenna connection ports 469.

In certain embodiments, the transmission manager device has a relatively small size and low power consumption, which may allow for placement in confined areas. Furthermore, the device may be configured to be paired with a V-Mount or Anton Bauer Gold-mount plate and battery. In certain embodiments, the device includes an internal rechargeable Li-Ion battery configured to allow for interchanging power sources without substantially interrupting live video feed.

Figure 5:
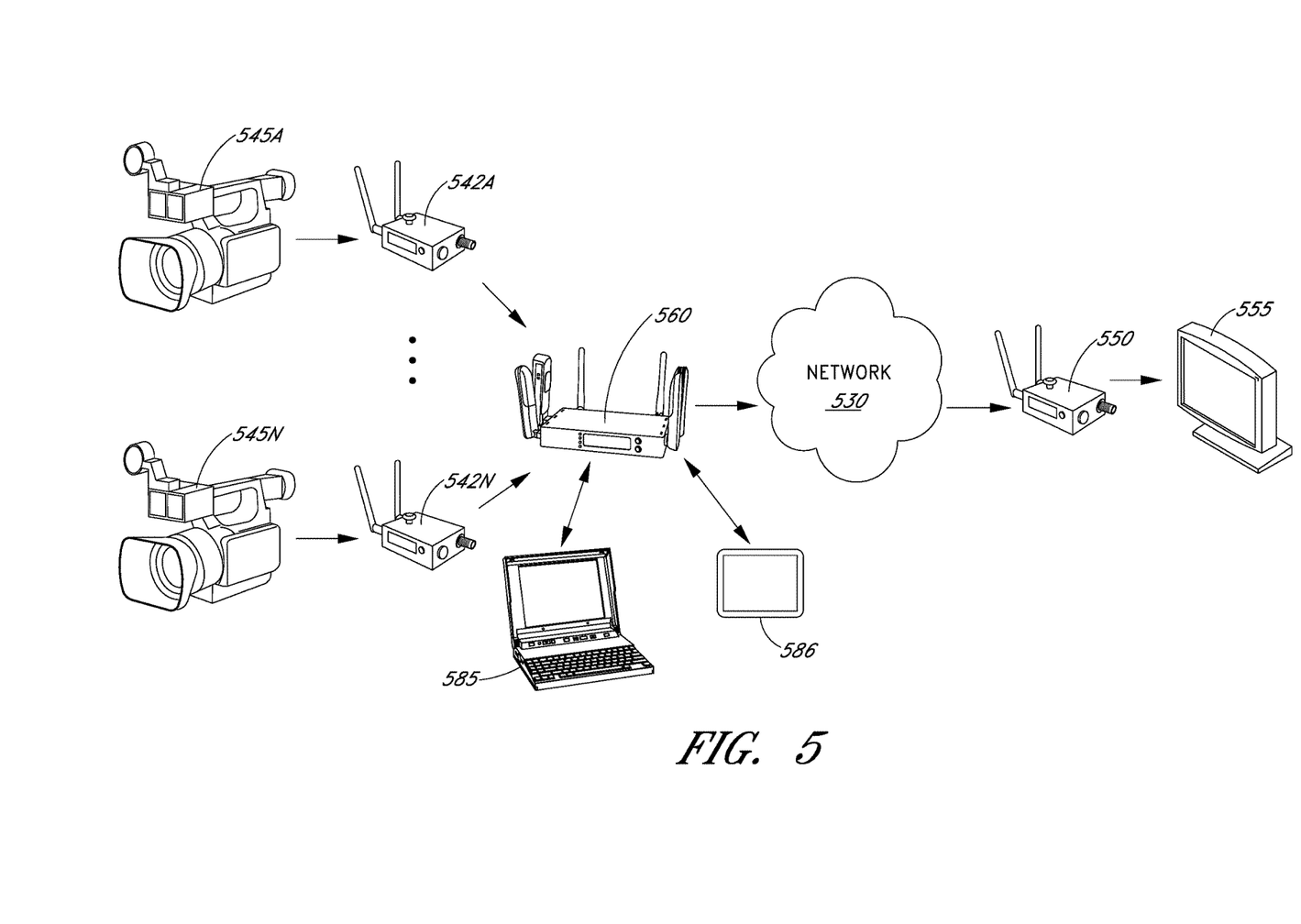
FIG. 5 is a network diagram schematically illustrating an embodiment of a live video bonded transmission system.

FIG. 5 is a network diagram schematically illustrating an embodiment of a live video bonded transmission system. In certain embodiments, the system includes a bonded wireless transmission device 560, as described above. The device 560 may be configured to support multiple encoders 542 from multiple cameras 545 over a Wi-Fi connection. For example, the device 560 may be configured to aggregate data from multiple encoders 542 and send the data over bonded cellular modems/Wi-Fi. In some embodiments, the encoders 542 include WiFi transmitters/receives or other wireless interfaces (for example, Bluetooth) for communicating with the bonded wireless transmission device 560.

In certain embodiments, the bonded wireless transmission device 260 accepts video feeds from multiple encoders and also supports connections from certain other 802.11 enabled devices for Internet access. Such functionality may enable broadcasters to quickly publish edited multi-camera content via FTP capabilities over a cellular connection. Furthermore, the wireless transmission device 560 may be configured to allow for WiFi or other wireless enabled devices, such as laptops 585, tablet computers 586, and the like, to monitor the live video stream and/or access the internet over the transmission device's cellular connection. In some embodiments, the encoders 542 also incorporate wireless access point technology that allows other wireless enabled devices to access the internet from the encoders 542 and through the bonded wireless transmission device 560. In some embodiments, the devices connected may control and/or monitor the audio/video feeds, the transmission manager and/or the transmission paths. Such devices may be connected to the transmission manager over a local network, or remotely connected through the same transmission paths as those used for sending the audio/video signals.

Many variations of the live video transmission system 100 are possible. For example, while the above implementations have generally described live video streams, embodiments of the live video transmission system 100 may be used with other types of media content, such as live audio streams or non-live video streams. In some embodiments, the system 100 may prioritize audio over video streams. In some embodiments, the system 100 may prioritize non-live video streams, such as, for example, control traffic, over the video streams.

As described above, the live video transmission systems described herein can be implemented with one or more physical servers or other computing machines, such as several computing machines interconnected via a network. Thus, each of the components depicted in the live video transmission systems above can include hardware and/or software for performing various features. In one embodiment, a live video transmission system is implemented on a computing system that hosts a web site or collection of web sites that the system monitors.

Live video transmission systems can include one or more servers for receiving and responding to network requests from customer systems. The one or more servers can include web servers, application servers, database servers, combinations of the same, or the like.

The processing of the various components of live video transmission systems can be distributed across multiple machines, networks, and other computing resources. Further, data repositories can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, live video transmission systems may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, live video transmission systems and their components are executed or embodied by one or more physical computing devices. For example, in some embodiments, a server computing system that has components including a central processing unit (CPU), input/output (I/O) components, storage, and memory may be used to execute some or all of the components of the live video transmission system. The I/O components can include a display, a network connection to the network 105, a computer-readable media drive, and other I/O devices (for example, a keyboard, a mouse, speakers, and so forth). In some embodiments, live video transmission systems may be configured differently than described above.

An embodiment of a live video transmission system can be stored as one or more executable program modules in the memory of the server and/or on other types of non-transitory computer-readable storage media, and can interact with computing assets over a network. In one embodiment, a live video transmission system may have additional components or fewer components than described above.

Each of the components, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, and so forth may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A bonded transmission system comprising:
   a plurality of electrical ports configured to electrically couple with two or more cellular transmitter devices;
   a wireless interface configured to generate a local area network path;
   a transmission manager comprising one or more processors, the transmission manager configured to:
      receive a live data signal from one or more encoder devices over the local area network path;
      divide the live data signal into a plurality of live transmission streams, wherein individual live transmission streams comprise a portion of data of the live data signal; and
      broadcast the plurality of live transmission streams over two or more wireless transmission paths, wherein each of the plurality of live transmission streams is broadcast separately over one of the transmission paths, wherein each transmission path is associated with a separate cellular transmitter device of the two or more transmitter devices;
   wherein the plurality of live transmission streams are configured to be combined to form the live data signal.

2. The system of claim 1, wherein the live data signal comprises at least one of audio or video.

3. The system of claim 1, wherein the wireless transmission path comprises one or more of: a cellular network, multiple cellular networks, a WiFi network, or a satellite network.

4. The system of claim 1, further comprising an electrical connection port configured to interface with a hard-lined link, wherein the hard-lined link comprises one or more of: Ethernet, cable or DSL.

5. The system of claim 1, wherein the transmission manager is further configured to dynamically adjust parameters of the live data signal based on a quality level sustainable by the transmission path.

6. The system of claim 5, wherein the transmission manager is configured to dynamically adjust parameters of the live data signal by adjusting a frame rate.

7. The system of claim 5, wherein the transmission manager is configured to dynamically adjust parameters of the live data signal by adjusting a bit rate.

8. The system of claim 1, wherein the transmission manager is configured to broadcast the plurality of live transmissions as multiple split streams.

9. The system of claim 1, wherein the transmission manager is configured to, if one of the multiple transmitters fails, attempt to continue broadcasting using the failed transmitter.

10. The system of claim 1, wherein the transmission manager is configured to, if one of the multiple transmitters fails, attempt to continue broadcasting using another transmitter.

11. The system of claim 1, wherein the bonded transmission system is configured to operate as a mobile hotspot.

12. A computer-implemented method for broadcasting live transmissions, the method comprising:

by a transmission system,
  generating a local area network path;
  receiving a live data signal from one or more encoder devices over the local area network path;
  dividing the live data signal into a plurality of live transmission streams, wherein individual live transmission streams comprise a portion of data of the live data signal; and
  broadcasting the plurality of live transmission streams over two or more wireless transmission paths, wherein each of the plurality of live transmission streams is broadcast separately over one of the transmission paths, wherein each transmission path is associated with a separate cellular transmitter device, wherein each cellular transmitter device is electrically coupled to a port of the transmission system;
  wherein the plurality of live transmission streams are configured to be combined to form the live data signal.

13. The computer-implemented method of claim 12, further comprising remotely controlling the live transmissions.

14. The computer-implemented method of claim 12, further comprising remotely monitoring the live transmissions.

15. The computer-implemented method of claim 12, further comprising operating as a mobile hotspot.

16. Non-transitory computer readable storage media storing computer-executable instructions that, when executed by a computer system, configure the computer system to perform operations including:
  generating a local area network path;
  receiving a live data signal from one or more encoder devices over the local area network path;
  dividing the live data signal into a plurality of live transmission streams, wherein individual live transmission streams comprise a portion of data of the live data signal; and
  broadcasting the plurality of live transmission streams over two or more wireless transmission paths, wherein each of the plurality of live transmission streams is broadcast separately over one of the transmission paths, wherein each transmission path is associated with a separate cellular transmitter device, wherein each cellular transmitter device is electrically coupled to a port of the computer system;
  wherein the plurality of live transmission streams are configured to be combined to form the live data signal.

17. The non-transitory computer-readable storage media of claim 16, wherein the operations further include remotely controlling the live transmissions.

18. The non-transitory computer-readable storage media of claim 16, wherein the operations further include monitoring the live transmissions.

19. The non-transitory computer-readable storage media of claim 16, wherein the operations further include operating as a mobile hotspot.

* * * * *